(No Model.)

H. L. MITCHELL.
COFFEE POT.

No. 593,277. Patented Nov. 9, 1897.

Witnesses.
J. R. Faxon
A. D. White

Inventor:
Herbert L. Mitchell.

UNITED STATES PATENT OFFICE.

HERBERT L. MITCHELL, OF PITTSBURG, PENNSYLVANIA, ASSIGNOR OF THREE-FOURTHS TO HOWARD L. MYERS AND GEO. W. SCHILLING, OF SAME PLACE.

COFFEE-POT.

SPECIFICATION forming part of Letters Patent No. 593,277, dated November 9, 1897.

Application filed September 4, 1896. Serial No. 604,912. (No model.)

*To all whom it may concern:*

Be it known that I, HERBERT L. MITCHELL, of Pittsburg, State of Pennsylvania, have invented an Improved Coffee-Pot, of which the following is a specification.

My invention consists in a construction and combination of parts, in connection with an ordinary coffee-pot, in producing coffee liquid, the coffee-grounds being put into a receptacle, the boiling water and steam passing through the coffee-grounds while cooking, and percolating the same until the essence is extracted, also by inverting the construction in the coffee-pot, and with coffee-grounds in the receptacle, by pouring boiling water through the receptacle, making an extract of coffee without boiling.

Figure 1:
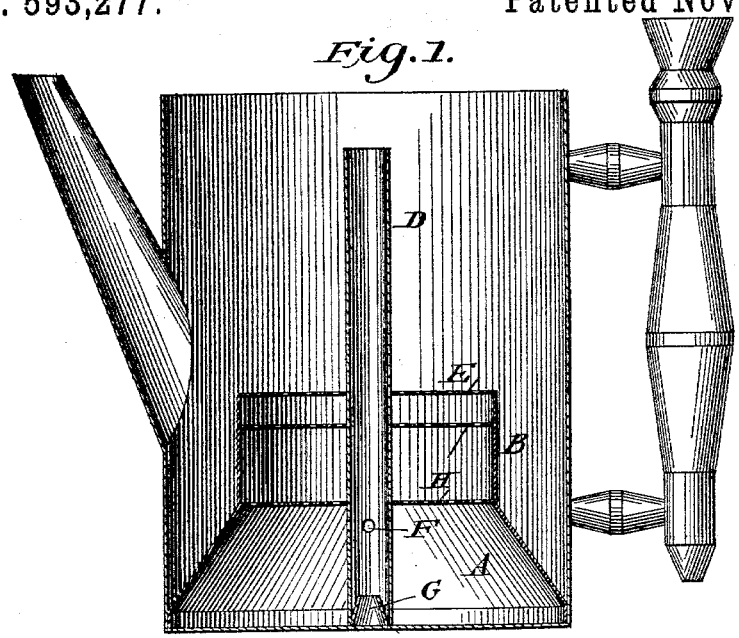
Figure 2:
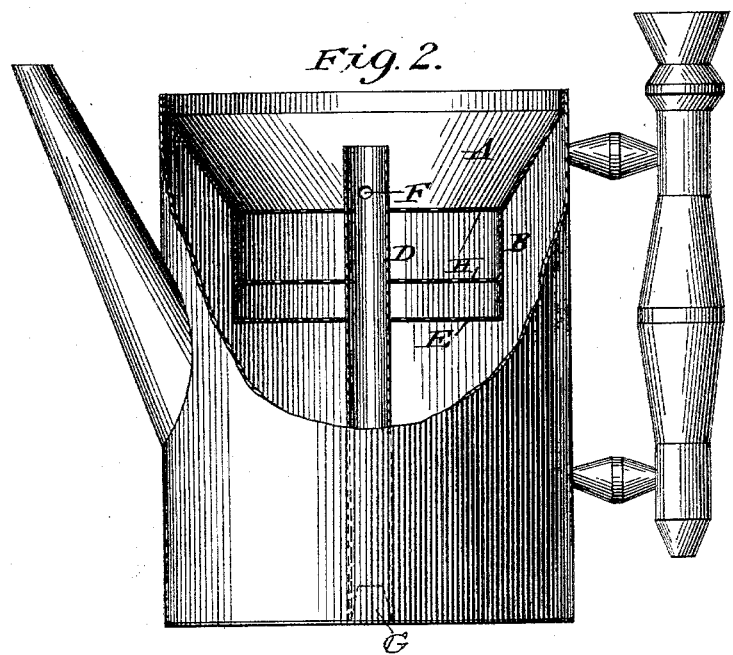

In the accompanying drawings, Figure 1 is a sectional view of a coffee-pot embodying my apparatus. Fig. 2 is a sectional view of a coffee-pot embodying my apparatus in its inverted position.

In Fig. 1, A is the water-chamber without bottom. As the water boils it is forced up through the coffee-chamber, (marked B,) which has a perforated bottom, (marked E,) through a lid, (marked H,) which is also perforated, into the coffee-pot, and thence back again into the water-chamber, (marked A.)

D is a tube open at both ends with the small holes, (marked F.) These holes are for the purpose of letting the extra pressure of water through when the coffee-chamber becomes obstructed. In the figures is a post (marked G) which is soldered to the bottom of the pot. The tube D is made to fit tightly over the post G to keep the apparatus in place when the water is boiling, so that the pressure cannot lift the apparatus.

The whole construction can be lifted out of the coffee-pot at any time desired, as all parts are soldered together, except the lid to coffee-chamber B, which is removable.

Fig. 2 in the drawings shows the other method. By lifting out the device and inverting same, letting the end of the tube D fit over the post G, the water-chamber A forms a funnel to pour the water into, as shown in the drawings.

The action is as follows: In the drawings of coffee-pot marked as Fig. 1 the coffee-grounds are put into the coffee-chamber B. Place the apparatus in the coffee-pot, put the desired amount of water in the pot, and let it boil until the desired strength is obtained. In Fig. 2 of the drawings is shown the other method. Put the coffee-grounds in chamber B, reverse the apparatus from the use in Fig. 1, pour boiling water into chamber A, which will pass through the perforated bottom E, through the coffee-chamber B, and perforated lid H into the coffee-pot, and pour this out through the spout into a vessel, thence through the coffee-chamber B again, the operation continuing until the desired strength is obtained.

What I claim as my invention, and desire to secure by Letters Patent, is as follows:

An apparatus for brewing coffee, consisting of the water-chamber A, coffee-chamber B, provided with a perforated bottom E, perforated lid H, tube D, provided with holes F, and post G, the said apparatus to be used in an ordinary coffee-pot with top and bottom of equal size constructed, arranged, and operating substantially as herein described and for the purpose set forth.

HERBERT L. MITCHELL.

Witnesses:
G. W. SCHILLING,
MARION H. MURPHY.